Patented Jan. 9, 1951

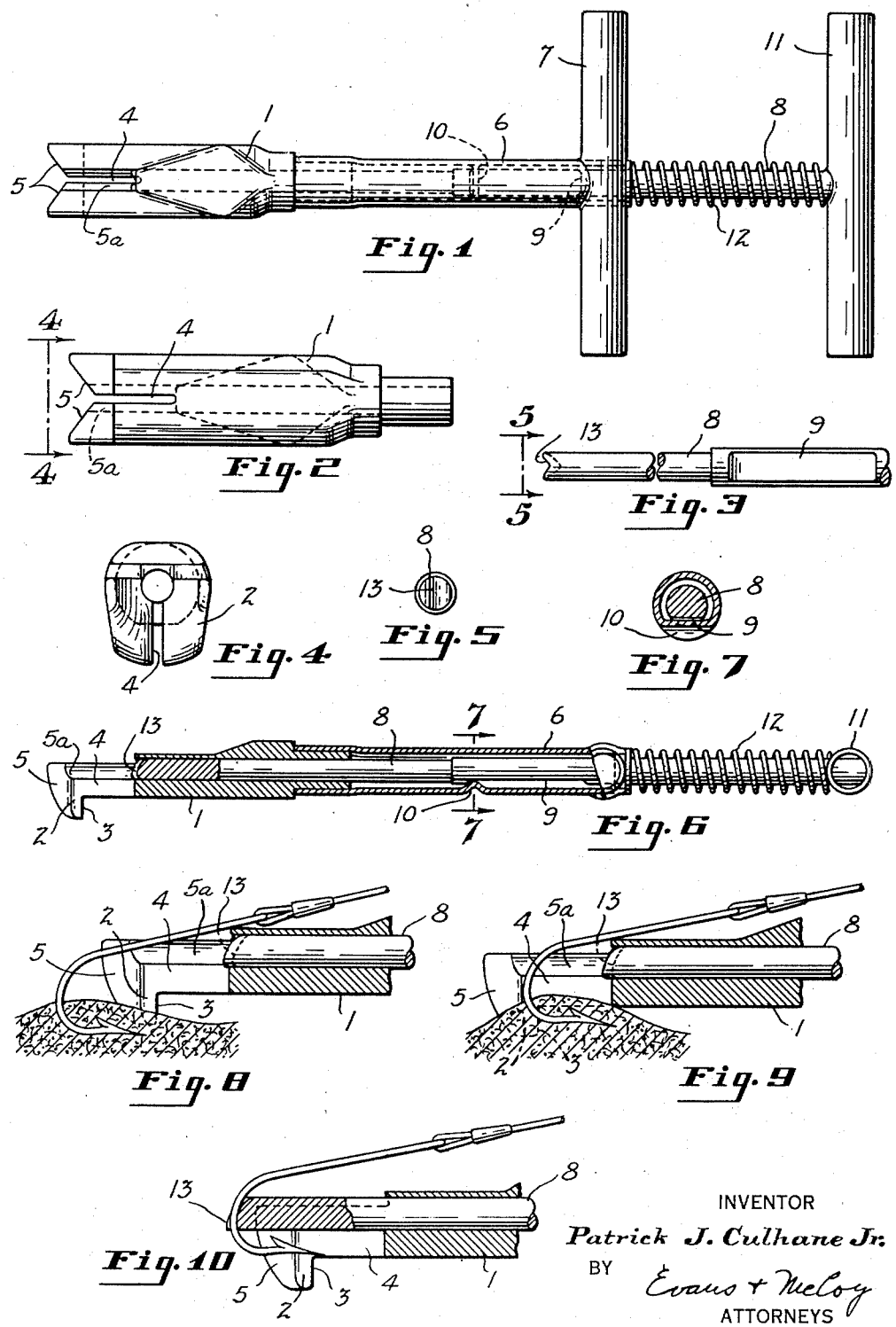

2,537,879

UNITED STATES PATENT OFFICE 2,537,879

FISHHOOK DISGORGER

Patrick J. Culhane, Jr., Cleveland Heights, Ohio

Application April 28, 1948, Serial No. 23,781

2 Claims. (Cl. 43—53.5)

This invention relates to disgorgers and has for its object to provide a simple and inexpensive instrument by means of which a fish hook may be quickly and easily extracted from the mouth, throat or stomach of a fish with a minimum of injury to the fish.

More specifically, it is the object of the invention to provide a disgorger consisting of a probe adapted to be guided by the fish line into engagement with the hook and a stripper carried by the probe for dislodging the hook, the hook engaging portion of the probe being formed to so position the hook with respect to the probe and striper that the barbed end of the hook is extracted with a minimum of injury to the tissues in which it is embedded.

With the above and other objects in view the invention may be said to comprise the disgorger as illustrated in the accompanying drawings and hereinafter described, together with such variations and modifications thereof as will be apparent to one skilled in the art to which the invention pertains.

Reference should be had to the accompanying drawings forming a part of this specification, in which:

Figure 1 is a plan view of a disgorger embodying the invention;

Fig. 2 is a fragmentary elevation of the forward end of the probe viewed from the side opposite that shown in Fig. 1;

Fig. 3 is a fragmentary elevation of the forward end of the stripper carried by the probe;

Fig. 4 is an end elevation of the probe viewed as indicated at 4—4 in Fig. 2 showing the head of the probe on an enlarged scale.

Fig. 5 is an end elevation of the stripper viewed as indicated at 5—5 in Fig. 3 showing the hook engaging end of the stripper on an enlarged scale;

Fig. 6 is a view showing the forward end of the disgorger in axial section and the rear end in side elevation;

Fig. 7 is a section on an enlarged scale taken on the line indicated at 7—7 in Fig. 6;

Figs. 8, 9 and 10 are fragmentary sectional views showing the disgorging operation, Fig. 8 showing the probe being guided to hook engaging position, Fig. 9 showing the probe in hook engaging position with the head advanced past the barb and curve of the hook, and Fig. 10 showing the stripper advanced to a position in which the barbed end of the hook has been forced into the narrow slot in the probe to dislodge it from the flesh of the fish;

As shown in the drawings, the body of the disgorger is in the form of a probe 1 having a rounded and tapering head 2 at its forward end. The head 2 projects past one side of the probe and is formed to provide a rearwardly facing substantially flat shoulder 3 that lies substantially at right angles to the body of the probe.

The forward end of the probe is provided with a narrow elongated longitudinal slot 4 that extends through and past the head 2 and that is adapted to receive a fish line to guide the probe into engagement with the fish hook to be extracted. The slot 4 has a flaring entrance portion 5 in the head 2 and is flared outwardly and upwardly, as shown in Figures 1, 4, and 6, to form a longitudinally extending groove 5a in the upper surface of the probe. The flaring end portion 5 is entirely in advance of the shoulder 3 so that the narrow portion of the slot 4 opens to the face of the shoulder 3. The probe 1 has an extension in the form of a sheet metal tube 6 to the rear end of which a cross bar 7 is attached to provide a hand grip.

Rearwardly of the slot 4 the probe 1 is of tubular form to provide a guide for a stripper 8 in the form of an elongated rod that has a sliding fit within the probe. The stripper 8 projects beyond the rear end of the tubular extension 6 of the probe 1 and has limited endwise movement in the probe. To limit the endwise movement of the stripper and prevent its removal from the probe, the stripper is provided with an elongated notch 9 and the tubular extension 6 has an inwardly pressed transverse rib 10 that engages in the notch 9. The movement of the stripper is that permitted by the slot 9, the stripper in its retracted position having its forward end adjacent the inner end of the slot 4 and in its advanced position having its forward end lying in the groove 5a and projecting beyond the forward end of the probe, as shown in Fig. 10.

At its rear end the stripper 8 has a transverse grip bar 11 attached thereto and between the grip bar 11 and the hand grip 7 a coil spring 12 is interposed which serves to normally hold the stripper in retracted position. The forward end of the stripper 8 is provided with a flaring notch 13 that is engageable with the curve of a fish hook to force the barbed end of the hook into the slot 4 to free the hook from the flesh of the fish.

In using the disgorger to free the fish from the hook the fish is held suspended by the line in one hand while the disgorger is gripped in the other hand and is engaged with the fish line by entering the line into the slot 4 and is slid down the line which guides the head of the probe to the shank of the hook as shown in Fig. 8. The flaring entrance to the slot 4 in the head 2 serves to facilitate the entry of the fish line into the slot 4 but its most important function is to automatically position the fish hook in the plane of the slot with its barbed end in line with the narrow slot 4. When the shank of the fish hook is engaged in the flaring entrance portion 5 of the slot 4, the hook is swung into the plane of the slot and its barb is alined with the slot. In passing from the position shown in Fig. 8 to the position shown in Fig. 9, the portions of the head on opposite sides of the slot straddle the barb of the hook, and the head in moving past the barbed end of the hook stretches the flesh tightly over the barb. After the shoulder 3 has passed the barb of the hook the barbed end of the hook is drawn toward the face of the probe by engagement of the probe with the shank of the hook compressing the flesh in which the hook is embedded into the slot 4. If the hook is not deeply embedded the pressure of the probe against the shank of the hook is often sufficient to dislodge the hook. If the hook is not dislodged by the thrust of the probe on the shank of the hook the stripper 8 is actuated to engage its flaring notch 13 with the curve of the fish hook and to force the barbed end of the hook toward the shoulder 3 and forwardly into the narrow slot 4 in the head 2 to free the hook from the flesh of the fish. Since the flesh is stretched tightly over the barb and confined by the narrow slot 4 during the movement of the barbed end of the hook into the head, the extraction of the hook is accomplished with a minimum tearing of the tissues in which the hook is embedded.

The thrust of the stripper on the curve of the hook exerts an additional thrust on the hook tending to move the barbed end into the slot 4 rearwardly of the head 2 and also tends to draw the shoulder 3 toward the barbed end of the hook confining the flesh directly overlying the barb against the shoulder 3 and forcing the barbed end of the hook into the head 2 as shown in Fig. 10 to completely free it from the flesh of the fish.

By reason of the fact that the probe is formed to slide along the line into engagement with the embedded hook and to engage with the hook to automatically position the same with respect to the stripper, it is unnecessary for the fisherman to grasp an undersized fish or to lift it out of the water, and such fish so released have a better chance of survival.

Certain species are sometimes unintentionally hooked that are so objectionable that fishermen usually cut their lines to avoid handling them. The service of the present invention enables the fisherman to readily free such objectionable catches. Other species of fish are awkward or dangerous to handle after they are landed, in which case the device of the present invention provides a very convenient means of freeing the fish from the hook without handling the fish.

It is to be understood that in accordance with the provisions of the patent statutes, variations and modifications of the specific devices herein shown and described may be made without departing from the spirit of the invention.

What I claim is:

1. A disgorger comprising an elongated probe having a body provided with a longitudinally extending groove in its upper surface and a downward projection at its forward end forming a vertically thickened head having a curved blunt nose and a blunt lower surface, said head being shaped to provide a rearwardly facing shoulder below the body of the probe, said head and the bottom of said groove being bifurcated by a slot extending rearwardly from the nose of the probe to a point to the rear of said shoulder for receiving the shank of a fish hook, said slot having vertical walls at said rearwardly facing shoulder and a flaring entrance portion disposed in said head entirely forwardly of said shoulder, the width of said slot rearwardly from said flaring entrance portion being substantially uniform, and an elongated stripper disposed in said groove, the forward end of said stripper being notched in vertical planes for embracing the shank of a fish hook disposed in said slot, said stripper being mounted in said groove for longitudinal sliding movement therealong between forward and rearward limits at which the forward end of the stripper is respectively disposed substantially beyond the end of the probe and substantially to the rear of said shoulder.

2. A disgorger according to claim 1 in which said shoulder is substantially flat and of substantial width from top to bottom thereof.

PATRICK J. CULHANE, Jr.

REFERENCES CITED

The following references are of record in the file of this patent:

UNITED STATES PATENTS

| Number | Name | Date |
| --- | --- | --- |
| 467,202 | Rutz | Jan. 19, 1892 |
| 1,777,695 | Jeffery | Oct. 7, 1930 |
| 2,054,236 | Behr | Sept. 15, 1936 |